(12) United States Patent
Cheng et al.

(10) Patent No.: US 10,244,524 B2
(45) Date of Patent: Mar. 26, 2019

(54) DATA TRANSMISSION METHOD, APPARATUS, AND NETWORK SYSTEM THAT SUPPORTS CPRI DATA CORRESPONDING TO MULTIPLE SERVICE FLOWS TO BE EXCHANGED

(71) Applicant: Huawei Technologies Co., Ltd., Shenzhen, Guangdong (CN)

(72) Inventors: Hao Cheng, Shanghai (CN); Zuomin Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 15/356,426

(22) Filed: Nov. 18, 2016

(65) Prior Publication Data

US 2017/0070983 A1     Mar. 9, 2017

Related U.S. Application Data

(63) Continuation of application No. PCT/CN2014/077976, filed on May 21, 2014.

(51) Int. Cl.
*H04W 4/00* (2018.01)
*H04W 72/04* (2009.01)
(Continued)

(52) U.S. Cl.
CPC ....... *H04W 72/044* (2013.01); *H04L 12/4633* (2013.01); *H04W 72/1263* (2013.01); *H04W 92/12* (2013.01); *H04W 88/085* (2013.01)

(58) Field of Classification Search
CPC ........... H04W 72/044; H04W 72/1263; H04W 92/12; H04W 88/085; H04L 12/4633
See application file for complete search history.

(56) References Cited

U.S. PATENT DOCUMENTS 6,751,228 B1 * 6/2004 Okamura ............. H04J 3/0632
370/412
2010/0189118 A1 7/2010 Nonaka
(Continued)

FOREIGN PATENT DOCUMENTS

CN     101005450 A     7/2007
CN     101248689 A     8/2008
(Continued)

OTHER PUBLICATIONS

Gerry Leavey, "Enabling Distributed Base Station Architectures with CPRI", PMC-Sierra, Inc., Feb. 1, 2006, 28 pages, XP007920617.

*Primary Examiner* — Maharishi V Khirodhar

(57) ABSTRACT

A data transmission method, an apparatus, and a network system are used to transmit common public radio interface (CPRI) data in the Ethernet, and can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility. A specific implementation method includes: receiving, by a sending apparatus, CPRI data, where the CPRI data includes CPRI data of at least one service flow; parsing out, from the CPRI data, a CPRI data payload corresponding to each service flow, and separately encapsulating, based on a dedicated processing frame header of each service flow, the CPRI data payload of the corresponding service flow, to obtain a packet of each service flow.

8 Claims, 8 Drawing Sheets

(51) Int. Cl.
*H04W 92/12* (2009.01)
*H04W 72/12* (2009.01)
*H04L 12/46* (2006.01)
*H04W 88/08* (2009.01)

(56) References Cited

U.S. PATENT DOCUMENTS

| | | | |
|---|---|---|---|
| 2013/0163524 A1* | 6/2013 | Shatzkamer | H04L 69/22 370/329 |
| 2014/0029617 A1* | 1/2014 | Wang | H04L 45/38 370/392 |
| 2014/0362763 A1 | 12/2014 | Hu et al. | |
| 2017/0055050 A1* | 2/2017 | Cavaliere | H04J 14/0209 |

FOREIGN PATENT DOCUMENTS

| | | |
|---|---|---|
| CN | 101931454 A | 12/2010 |
| CN | 102118191 A | 7/2011 |
| CN | 102547778 A | 7/2012 |
| CN | 102802170 A | 11/2012 |
| CN | 102868610 A | 1/2013 |
| CN | 103404226 A | 11/2013 |
| CN | 103533630 A | 1/2014 |
| EP | 1860895 A1 | 11/2007 |
| WO | 2013/189553 A1 | 12/2013 |

\* cited by examiner

DATA TRANSMISSION METHOD, APPARATUS, AND NETWORK SYSTEM THAT SUPPORTS CPRI DATA CORRESPONDING TO MULTIPLE SERVICE FLOWS TO BE EXCHANGED

CROSS-REFERENCE TO RELATED APPLICATIONS

This application is a continuation of International Application No. PCT/CN2014/077976, filed on May 21, 2014, the disclosure of which is hereby incorporated by reference in its entirety.

TECHNICAL FIELD

The present invention relates to the communications field, and in particular, to a data transmission method, an apparatus, and a network system.

BACKGROUND

In the current wireless communications field, the common public radio interface (CPRI) is a communications interface standard between a building baseband unit (BBU) and a radio remote unit (RRU) in a radio base station device in the current wireless communications industry. CPRI interfaces are interconnected by using a special CPRI network. An existing method for CPRI networking mainly includes: performing point-to-point optical fiber transmission connection by using a direct-connect fiber; or performing radio frequency or baseband interconnection between a BBU and an RRU by using a special CPRI switching device. However, for performing point-to-point transmission connection by using an optical fiber, multiple direct-connect fibers are required to connect CPRI ports of multiple RRUs to CPRI ports of multiple BBUs. As a result, networking costs are excessively high and a network layout is inflexible. In contrast, for performing interconnection between a BBU and an RRU by using a special CPRI switching device, a specially-developed CPRI switching device is required to implement an information exchange between the BBU and the RRU. However, the specially-developed CPRI switching device is not applicable to an existing transmission network, for example, a dedicated network needs to be laid out to perform data transmission, and transmission cannot be performed by using a standard Ethernet transmission network. Consequently, a layout of a dedicated network for data transmission increases difficulty and CPRI networking costs, and an operator cannot perform interconnection networking between a BBU and an RRU or between BBUs by using the existing Ethernet transmission network, resulting in waste of resources.

Based on the foregoing description, a potential solution is to directly switch a CPRI interface to an Ethernet transmission network, and transmit CPRI data by using the Ethernet transmission network. However, the inventor finds that, although CPRI data can be transmitted by using a 10G physical-layer interface and physical-layer medium by carrying the CPRI data in an Ethernet physical-layer data format at a physical layer, the foregoing CPRI data transmission process involves only transmission of an entire CPRI data frame, and only a CPRI data frame corresponding to a single service flow can be transmitted at a time. As a result, only point-to-point data transmission between an RRU and a BBU can be performed in the entire process, which limits networking flexibility, and cannot be applied to point-to-multipoint data transmission between multiple RRUs and multiple BBUs.

SUMMARY

Embodiments of the present invention provide a data transmission method, an apparatus, and a network system, which can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

To achieve the foregoing objective, the following technical solutions are used in the embodiments of the present invention.

According to a first aspect, a sending apparatus is provided, including:

a receiving unit, configured to receive data carried over common public radio interface CPRI specifications (CPRI data for short), where the CPRI data includes CPRI data of at least one service flow;

a parsing unit, configured to parse out, from the CPRI data received by the receiving unit, a CPRI data payload corresponding to each service flow, and separately encapsulate, based on a dedicated processing frame header of each service flow, the CPRI data payload corresponding to the corresponding service flow, to obtain a packet of each service flow, where the dedicated processing frame header includes a service flow identifier corresponding to the service flow; and a sending unit, configured to transmit the packet, obtained by the parsing unit, of each service flow to a receiving apparatus.

In a first possible implementation manner of the first aspect, the sending apparatus further includes:

a recording unit, configured to separately record, into the dedicated processing frame header of the corresponding packet, a first time point at which the sending apparatus sends the packet of each service flow.

With reference to the first aspect and the first possible implementation manner of the first aspect, in a second possible implementation manner of the first aspect, the sending apparatus further includes:

a determining unit, configured to determine a second time point at which the receiving apparatus outputs CPRI data obtained by parsing the received packet; where the sending unit is further configured to send, to the receiving apparatus, a service flow message corresponding to each service flow, where the service flow message includes the second time point and a corresponding service flow parsing parameter.

According to the second possible implementation manner of the first aspect, in a third possible implementation manner of the first aspect, the receiving unit is further configured to receive a delay error, sent by the receiving apparatus, of a current data link between the sending apparatus and the receiving apparatus; and the determining unit is specifically configured to determine, according to the delay error, received by the receiving unit, of the current data link between the sending apparatus and the receiving apparatus, the second time point at which the receiving apparatus outputs the CPRI data obtained by parsing the received packet.

With reference to any one of the first aspect, or the first to the third possible implementation manners of the first aspect, in a fourth possible implementation manner of the first aspect, that the sending unit transmits, by using a switching apparatus, the packet of each service flow obtained by the parsing unit to the receiving apparatus specifically includes:

transmitting, by using the switching apparatus and a network protocol of a switched network, the packet, obtained by the parsing unit, of each service flow to the receiving apparatus, where the switching apparatus includes a switch or a router.

According to a second aspect, a receiving apparatus is provided, including:

a receiving unit, configured to receive a packet;

a parsing unit, configured to parse the packet received by the receiving unit, and obtain a service flow identifier, included in a dedicated processing frame header of the packet, of a service flow corresponding to the packet;

an obtaining unit, configured to obtain a service flow message corresponding to the packet according to the service flow identifier, parsed out by the parsing unit, of the service flow corresponding to the packet, where the service flow message includes a second time point that is used to instruct the receiving apparatus to send the packet;

a determining unit, configured to determine a third time point at which the receiving unit receives the packet; where the parsing unit is further configured to parse the packet if it is determined that the second time point obtained by the obtaining unit is greater than or equal to the third time point determined by the determining unit, and encapsulate a parsed-out data payload in the packet into CPRI data; and an output unit, configured to output, at the second time point according to an instruction of the service flow message obtained by the obtaining unit, the CPRI data parsed out by the parsing unit.

In a first possible implementation manner of the second aspect, the receiving apparatus further includes:

a measurement unit, configured to perform a latency measurement on at least one packet transmitted in a current data link between the sending apparatus and the receiving apparatus, and obtain an average latency and a latency jitter amount of the data link according to a transmission latency, obtained by means of measurement, of each packet of the at least one packet; and the determining unit is further configured to determine a delay error of the data link according to the average latency of the data link, a maximum latency jitter amount of the data link, and a jitter tolerance margin of the data link that are obtained by means of measurement by the measurement unit; and the output unit is further configured to send the delay error of the data link to the sending apparatus.

According to the first possible implementation manner of the second aspect, in a second possible implementation manner of the second aspect, that the measurement unit performs a latency measurement on any one packet transmitted in the current data link between the sending apparatus and the receiving apparatus specifically includes:

obtaining a first time point, at which the sending apparatus sends the any one packet, included in a dedicated processing frame header of the any one packet; and determining a transmission latency of the any one packet according to the first time point at which the sending apparatus sends the any one packet and the third time point at which the receiving apparatus receives the any one packet; where the any one packet is one of the at least one packet.

With reference to the second aspect, the first possible implementation manner of the second aspect, or the second possible implementation manner of the second aspect, in a third possible implementation manner of the second aspect, the service flow message further includes a service flow parsing parameter; and that the parsing unit parses the packet and encapsulates a parsed-out data payload in the packet into CPRI data specifically includes: parsing the packet based on the service flow parsing parameter in the parsed-out service flow message, and encapsulating the parsed-out data payload in the packet into the CPRI data.

According to a third aspect, a data transmission method is provided, including:

receiving, by a sending apparatus, data carried over common public radio interface CPRI specifications (CPRI data for short), where the CPRI data includes CPRI data of at least one service flow;

parsing out, from the CPRI data, a CPRI payload and a CPRI data payload corresponding to each service flow, and separately encapsulating, based on a dedicated processing frame header of each service flow, the CPRI payload and the CPRI data payload of the corresponding service flow, to obtain a packet of each service flow, where the dedicated processing frame header includes a service flow identifier corresponding to the service flow; and transmitting the packet of each service flow to a receiving apparatus.

In a first possible implementation manner of the third aspect, the method further includes:

separately recording, into the dedicated processing frame header of the corresponding packet, a first time point at which the sending apparatus sends the packet of each service flow.

With reference to the third aspect or the first possible implementation manner of the third aspect, in a second possible implementation manner of the third aspect, the method further includes:

determining a second time point at which the receiving apparatus outputs CPRI data obtained by parsing the received packet; and sending, to the receiving apparatus, a service flow message corresponding to each service flow, where the service flow message includes the second time point and a corresponding service flow parsing parameter.

According to the second possible implementation manner of the third aspect, in a third possible implementation manner of the third aspect:

receiving a delay error, sent by the receiving apparatus, of a current data link between the sending apparatus and the receiving apparatus; and the determining a second time point at which the receiving apparatus outputs CPRI data obtained by parsing the received packet specifically includes: determining, according to the delay error of the current data link between the sending apparatus and the receiving apparatus, the second time point at which the receiving apparatus outputs the CPRI data obtained by parsing the received packet.

With reference to any one of the third aspect, or the first to the third possible implementation manners of the third aspect, in a fourth possible implementation manner of the third aspect, the transmitting the packet of each service flow to a receiving apparatus specifically includes:

transmitting, by using a switching apparatus and a network protocol of a switched network, the packet of each service flow to the receiving apparatus, where the switching apparatus includes a switch or a router.

According to a fourth aspect, a data transmission method is provided, including:

receiving a packet by a receiving apparatus;

parsing the packet, and obtaining a service flow identifier, included in a dedicated processing frame header of the packet, of a service flow corresponding to the packet;

obtaining a service flow message corresponding to the packet according to the service flow identifier of the service flow corresponding to the packet, where the service flow message includes a second time point that is used to instruct the receiving apparatus to send the packet;

determining a third time point at which the receiving apparatus receives the packet;

parsing the packet if it is determined that the second time point is greater than or equal to the third time point, and encapsulating a parsed-out data payload in the packet into CPRI data; and outputting the CPRI data according to an instruction of the service flow message at the second time point.

In a first possible implementation manner of the fourth aspect, before the receiving apparatus receives the packet sent by a switching apparatus, the method further includes:

performing a latency measurement on at least one packet transmitted in a current data link between the sending apparatus and the receiving apparatus;

obtaining an average latency and a latency jitter amount of the data link according to a transmission latency, obtained by means of measurement, of each packet of the at least one packet;

determining a delay error of the data link according to the average latency of the data link, a maximum latency jitter amount of the data link, and a jitter tolerance margin of the data link;

and sending the delay error of the data link to the sending apparatus.

According to a first possible implementation manner of the fourth aspect, in a second possible implementation manner of the fourth aspect:

the performing a latency measurement on any one packet transmitted in a current data link between the sending apparatus and the receiving apparatus is specifically used to:

obtain a first time point, at which the sending apparatus sends the packet, included in a dedicated processing frame header of the packet; and determine a transmission latency of the any one packet according to the first time point at which the sending apparatus sends the any one packet and the third time point at which the receiving apparatus receives the any one packet, where the any one packet is one of the at least on packet.

With reference to the fourth aspect, the first possible implementation manner of the fourth aspect, or the second possible implementation manner of the fourth aspect, in a third possible implementation manner of the fourth aspect, the service flow message further includes a service flow parsing parameter; and that the parsing the packet and encapsulating a parsed-out data payload in the packet into CPRI data specifically includes: parsing the packet based on the service flow parsing parameter in the service flow message, and encapsulating the parsed-out data payload in the packet into the CPRI data.

According to a fifth aspect, a sending device is provided, including:

a receiver, configured to receive data carried over common public radio interface CPRI specifications (CPRI data for short), where the CPRI data includes CPRI data of at least one service flow;

a processor, configured to parse out, from the CPRI data, a CPRI data payload corresponding to each service flow, and separately encapsulate, based on a dedicated processing frame header of each service flow, the CPRI data payload of the corresponding service flow, to obtain a packet of each service flow, where the dedicated processing frame header includes a service flow identifier corresponding to the service flow; and a transmitter, configured to transmit, by using a switching apparatus, the packet of each service flow to a receiving apparatus.

In a first possible implementation manner of the fifth aspect, the processor is further configured to separately record, into the dedicated processing frame header of the corresponding packet, a first time point at which the packet of each service flow is sent.

With reference to the fifth aspect and the first possible implementation manner of the fifth aspect, in a second possible implementation manner of the fifth aspect, the processor is further configured to determine a second time point at which the receiving apparatus outputs CPRI data obtained by parsing the received packet; and configured to send, to the receiving apparatus, a service flow message corresponding to each service flow, where the service flow message includes a corresponding service flow parsing parameter and the second time point that is used to instruct the receiving apparatus to send the packet of each service flow.

According to the second possible implementation manner of the fifth aspect, in a third possible implementation manner of the fifth aspect, the processor is further configured to receive a delay error, sent by the receiving apparatus, of a current data link between the sending apparatus and the receiving apparatus; and the determining a second time point at which the receiving apparatus outputs CPRI data obtained by parsing the received packet is specifically used to determine, according to the delay error of the current data link between the sending apparatus and the receiving apparatus, the second time point at which the receiving apparatus outputs the CPRI data obtained by parsing the received packet.

With reference to any one of the fifth aspect, or the first to the third possible implementation manners of the fifth aspect, in a fourth possible implementation manner of the fifth aspect:

the transmitter is specifically configured to transmit, by using the switching apparatus and a network protocol of a switched network, the packet of each service flow to the receiving apparatus, where the switching apparatus includes a switch or a router.

According to a sixth aspect, a receiving device is provided, including:

a receiver, configured to receive a packet;

a processor, configured to parse the packet and obtain a service flow identifier, included in a dedicated processing frame header of the packet, of a service flow corresponding to the packet; configured to obtain a service flow message corresponding to the packet according to the service flow identifier of the service flow corresponding to the packet, where the service flow message includes a second time point that is used to instruct the receiving apparatus to send the packet; configured to determine a third time point at which the receiving apparatus receives the packet; and configured to parse the packet if it is determined that the second time point is greater than or equal to the third time point, and encapsulate a parsed-out data payload in the packet into CPRI data; and a transmitter, configured to output the CPRI data at the second time point according to an instruction of the service flow message.

In a first possible implementation manner of the sixth aspect, the processor is further configured to perform a latency measurement on at least one packet transmitted in a current data link between the sending apparatus and the receiving apparatus; configured to obtain an average latency and a latency jitter amount of the data link according to a transmission latency, obtained by means of measurement, of each packet of the at least one packet; and configured to determine a delay error of the data link according to the average latency of the data link, a maximum latency jitter amount of the data link, and a jitter tolerance margin of the data link; and the transmitter is further configured to send the delay error of the data link to the sending apparatus.

According to a first possible implementation manner of the sixth aspect, in a second possible implementation manner of the sixth aspect, that the processor performs a latency measurement on any one packet transmitted in a current data link between the sending apparatus and the receiving apparatus is specifically used to:

obtain a first time point, at which the sending apparatus sends the any one packet, included in a dedicated processing frame header of the any one packet; and determine a transmission latency of the any one packet according to the first time point at which the sending apparatus sends the any one packet and the third time point at which the receiving apparatus receives the any one packet, where the any one packet is one of the at least on packet.

With reference to the sixth aspect, the first possible implementation manner of the sixth aspect, or the second possible implementation manner of the sixth aspect, in a third possible implementation manner of the sixth aspect, the service flow message further includes a service flow parsing parameter;

that the processor parses the packet and encapsulates a parsed-out data payload in the packet into CPRI data is specifically used to: parse the packet based on the service flow parsing parameter in the service flow message, and encapsulate the parsed-out data payload in the packet into the CPRI data.

According to a seventh aspect, a network system is provided, including: a sending apparatus and a receiving apparatus, where the sending apparatus is any one sending apparatus described above, and the receiving apparatus is any one receiving apparatus described above.

According to an eighth aspect, a network system is provided, including: a sending device and a receiving device, where the sending device is any one sending device described above, and the receiving device is any one receiving device described above.

According to a data transmission method, an apparatus, and a network system that are provided by the embodiments of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. An existing CPRI data transmission solution by using an Ethernet transmission network is specific to only point-to-point transmission of a CPRI data frame corresponding to a single service flow, which limits networking flexibility. However, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The CPRI is a communications interface standard between a BBU and an RRU that are in a radio base station device in the current radio communications industry. Each CPRI interface is a transmission interface of a timeslot structure. Generally, time is divided according to 260 ns (a time of 1/3.84 MHz) for a high-speed link, and transmission is performed periodically in the 260 ns obtained by division. Each 260 ns is further divided into several time units with a changeable length. Digital-to-analog conversion sample data of an antenna port is transmitted in each time unit, which is referred to as AxC. AxCs having a binding processing relationship generally belong to data of a same cell. Such a transmission manner in which each cell performs sending periodically in a cycle of 260 ns is referred to as a TDM (Time Division Multiplexing, time division multiplexing) manner. Correspondingly, a CPRI network may be also referred to as a synchronous TDM network. In addition, because an ETH (Ethernet, Ethernet) network is an asynchronous packet switched network on which data is transmitted in a packet transfer manner, each packet has no fixed transmission cycle in the ETH network, and a datagram size of each packet is different. Therefore, if requirement differences between the ETH asynchronous packet switched network and the CPRI synchronous TDM network on a latency jitter, timing precision, and latency symmetry cannot be resolved, a standard ETH network cannot properly transmit CPRI data after a CPRI interface is switched to the ETH network. Based on the foregoing description, the present invention provides a data transmission method, an apparatus, and a network system for transmitting CPRI data by using an ETH network.

Figure 1:
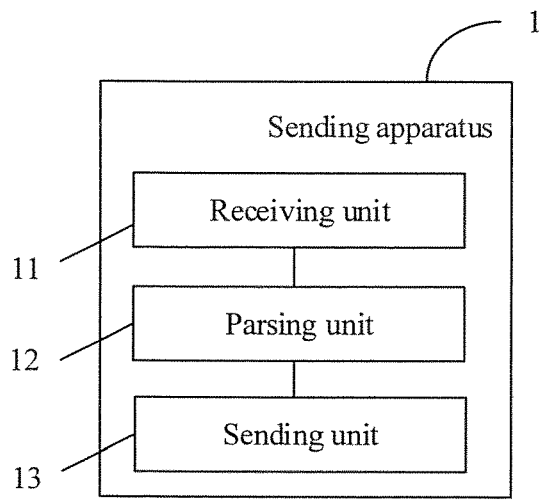
FIG. 1 is a schematic apparatus diagram of a sending apparatus according to an embodiment of the present invention.

As shown in FIG. 1, an embodiment of the present invention provides a sending apparatus. The sending apparatus may be implemented by using hardware or software, and multiple sending apparatuses may be disposed on one hardware entity. Specifically, a sending apparatus 1 includes: a receiving unit 11, a parsing unit 12, and a sending unit 13.

The receiving unit 11 is configured to receive CPRI data, where the foregoing CPRI data includes CPRI data of at least one service flow.

The parsing unit 12 is configured to: parse out, from the CPRI data received by the receiving unit 11, a CPRI data payload corresponding to each service flow, and separately encapsulate, based on a dedicated processing frame header of each service flow, the CPRI data payload of the corresponding service flow, to obtain a packet of each service flow.

Exemplarily, the sending apparatus strips, from the received CPRI data, the CPRI data payload carried in the CPRI data, and groups the stripped CPRI data payload, that is, the CPRI data corresponding to each service flow is classified into one group. The service flow may be a service flow of a single cell or cells with a same route, which is not limited herein and may be set according to practical application.

Specifically, each service flow in the foregoing CPRI data is corresponding to one dedicated processing frame header. Exemplarily, a service flow of the at least one service flow is used as an example herein. If a packet corresponding to the service flow needs to be obtained, the sending apparatus first needs to obtain a dedicated processing frame header corresponding to the service flow, and encapsulate a CPRI data payload corresponding to the service flow by using the dedicated processing frame header, to obtain the packet corresponding to the service flow. The dedicated processing frame header includes at least a time stamp field and a service flow identifier field. Specifically, the time stamp field may be used to carry a time point at which the sending apparatus sends the packet corresponding to the service flow; the service flow identifier field includes a service flow identifier corresponding to the service flow. A receiving apparatus and a sending apparatus use a service flow identifier to identify a service flow to which each packet belongs.

It should be noted that, the foregoing dedicated processing frame header of the packet may be used to not only carry the time point at which the sending apparatus sends the packet and the service flow identifier, but also carry information such as a priority, a packet fragment sequence number, and a cyclic redundancy check (CRC).

The sending unit 13 is configured to transmit the packet, obtained by the parsing unit 12, of each service flow to the receiving apparatus.

According to the sending apparatus provided in this embodiment of the present invention, the sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

Figure 2:
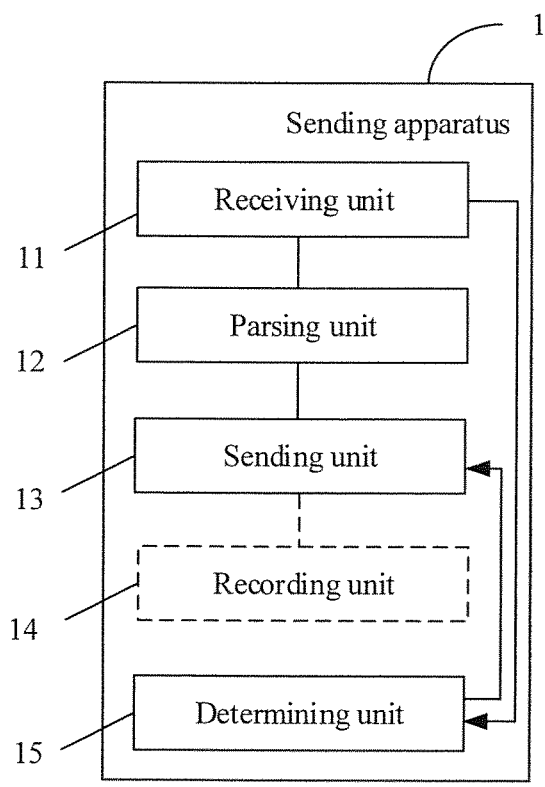
FIG. 2 is a schematic apparatus diagram of another sending apparatus according to an embodiment of the present invention.

Optionally, as shown in FIG. 2, the sending apparatus 1 further includes a recording unit 14.

The recording unit 14 is configured to separately record, into a dedicated processing frame header of the corresponding packet, a first time point at which the sending unit 11 sends the packet of each service flow.

Optionally, as shown in FIG. 2, the sending apparatus 1 further includes a determining unit 15.

The determining unit 15 is configured to determine a second time point at which the receiving apparatus outputs CPRI data obtained by parsing the received packet.

The sending unit 12 is further configured to send, to the receiving apparatus, a service flow message corresponding to each service flow.

The service flow message includes the second time point that is used to instruct the receiving apparatus to send the packet of each service flow and a corresponding service flow parsing parameter. The service flow parsing parameter includes a data format, on a CPRI, of the CPRI data carried in the packet corresponding to the service flow, parsing information that is used to parse the packet corresponding to the service flow, and the like.

Further, optionally, the foregoing receiving unit 11 is further configured to receive a delay error, sent by the receiving apparatus, of a current data link between the sending apparatus and the receiving apparatus.

After the receiving unit 11 receives the delay error, sent by the receiving apparatus, of the current data link between the sending apparatus and the receiving apparatus, the determining unit 15 determines, according to the delay error, received by the receiving unit 11, of the current data link between the sending apparatus and the receiving apparatus, the second time point at which the receiving apparatus outputs the CPRI data obtained by parsing the received packet.

Exemplarily, the determining unit 15 may determine, according to the delay error, received by the receiving unit 11, of the current data link between the sending apparatus and the receiving apparatus, a maximum error of a transmission latency of a packet transmitted in the current data link between the sending apparatus and the receiving apparatus, and then determine a time period that is greater than the delay error, and determine, according to the time period and a synchronization time point that is determined by the sending apparatus and the receiving apparatus, the second time point at which the receiving apparatus sends each packet.

Optionally, the sending unit 14 is specifically configured to:

transmit, by using a switching apparatus and a network protocol of a switched network, the packet, obtained by the parsing unit 12, of each service flow to the receiving apparatus, where the switching apparatus includes a switch or a router.

Exemplarily, the sending apparatus allows the packet to be carried at a MAC (Media Access Control, Media Access Control) layer of the ETH, and transmits the packet in the network by using an ETH switching device (for example, a switch); or carries the packet at an IP (Internet Protocol, Internet Protocol) layer, and transmits the packet in the network by using an ETH switching device (for example, a routing device); or carries the packet at a UDP (User Datagram Protocol, User Datagram Protocol) layer, and transmits the packet in the network by using an ETH switching device (for example, a routing device).

According to the sending apparatus provided in this embodiment of the present invention, the sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

The unit division of the sending apparatus in this embodiment of the present invention is an exemplary description, and in practice, there may be multiple unit division methods for constituting the sending apparatus in this embodiment of the present invention.

Figure 3:
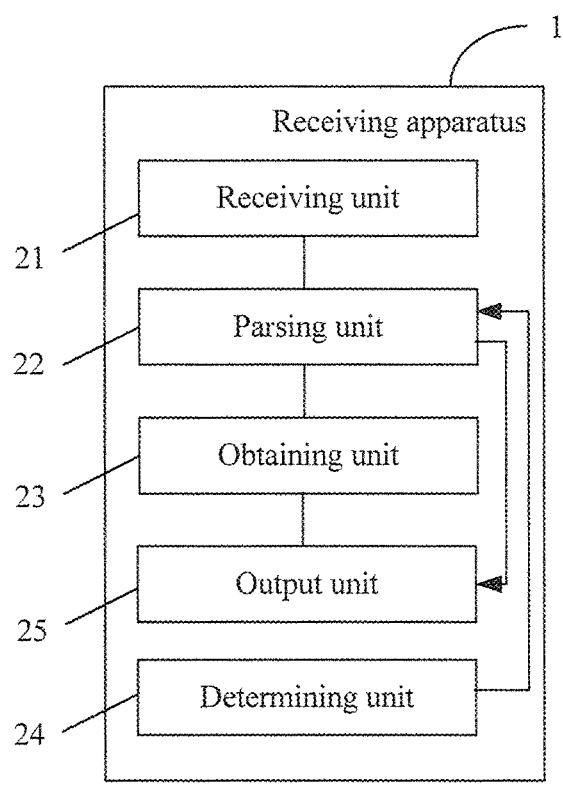
FIG. 3 is a schematic apparatus diagram of a receiving apparatus according to an embodiment of the present invention.

Corresponding to the sending apparatus provided by the embodiment of the present invention, an embodiment of the present invention further provides a receiving apparatus. The receiving apparatus may be implemented by using hardware or software, and multiple receiving apparatuses may be disposed on one hardware entity. As shown FIG. 3, a receiving apparatus 2 includes: a receiving unit 21, a parsing unit 22, an obtaining unit 23, a determining unit 24, and an output unit 25.

The receiving unit 21 is configured to receive a packet. Each packet received by the foregoing receiving unit 21 is corresponding to a service flow, and the service flow in this embodiment of the present invention may be a single cell, and may also be cells with a same route, which is not limited herein and may be set according to practical application.

The parsing unit 22 is configured to parse the packet received by the receiving unit 21, and obtain a service flow identifier, included in a dedicated processing frame header of the packet, of a service flow corresponding to the packet.

Exemplarily, the parsing unit 22 performs decapsulation on the packet received by the receiving unit 21, to obtain a dedicated processing frame header of the packet and a datagram of the packet; obtains the service flow identifier of the service flow corresponding to the packet from a service flow identifier field in the dedicated processing frame header; and obtains, from a time stamp field in the dedicated processing frame header, a first time point at which a sending apparatus sends the packet.

The obtaining unit 23 is configured to obtain a service flow message corresponding to the packet according to the service flow identifier, parsed out by the parsing unit 22, of the service flow corresponding to the packet.

The foregoing service flow message includes a second time point at which the receiving apparatus needs to output CPRI data obtained by parsing the received packet and a corresponding service flow parsing parameter. The service flow parsing parameter includes a data format, on a CPRI, of the CPRI data carried in the packet corresponding to the service flow, parsing information that is used to parse the packet corresponding to the service flow, and the like. Exemplarily, the service flow message and the packet carrying the CPRI data are usually separately transmitted to the receiving apparatus; and after receiving the service flow message, the receiving apparatus obtains the service flow identifier that matches the service flow message, and obtains, from the service flow message, the second time point at which the receiving apparatus needs to output the CPRI data obtained by parsing the received packet.

The determining unit 24 is configured to determine a third time point at which the receiving apparatus receives the packet.

The parsing unit 22 is configured to parse the packet if it is determined that the second time point obtained by the obtaining unit 23 is greater than or equal to the third time point determined by the determining unit 24, and encapsulate a parsed-out data payload in the packet into CPRI data.

Exemplarily, after receiving the packet, the receiving apparatus records a time point (that is, the third time point) at which the receiving apparatus receives the packet, and compares the third time point with the second time point that is obtained by the obtaining unit 23 and that is used to instruct the receiving apparatus to send the packet. If the third time point is greater than the second time point, the packet is expired; or if the third time point is less than or equal to the second time point, the packet is cached until the second time point for output. Before the output, the receiving apparatus needs to restore, according to the service flow parsing parameter corresponding to the packet, the data payload carried in the packet to a CPRI data payload format for output.

The output unit 25 is configured to output, at the second time point according to an instruction of the service flow message obtained by the obtaining unit 23, the CPRI data parsed out by the parsing unit 22.

According to the receiving apparatus provided in this embodiment of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to the receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

Figure 4:
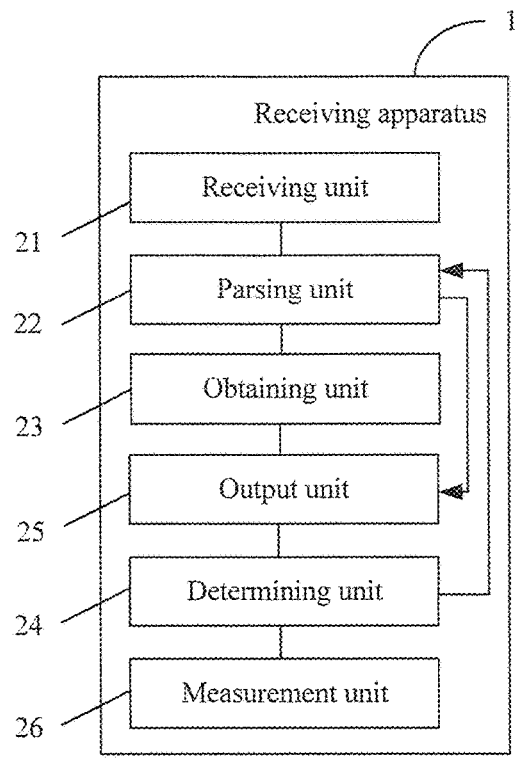
FIG. 4 is a schematic apparatus diagram of another receiving apparatus according to an embodiment of the present invention.

Optionally, as shown in FIG. 4, the receiving apparatus 2 further includes a measurement unit 26.

Before the receiving apparatus receives, by using the receiving unit 21, the packet sent by the sending apparatus, the measurement unit 26 of the receiving apparatus needs to perform a latency measurement on at least one packet transmitted in a current data link between the sending apparatus and the receiving apparatus, and obtain an average latency and a latency jitter amount of the data link according to a transmission latency, obtained by means of measurement, of each packet of the at least one packet.

After receiving the average latency of the data link, a maximum latency jitter amount of the data link, and a jitter tolerance margin of the data link, the determining unit 24 of the receiving apparatus determines, according to measurement data obtained by means of measurement by the measurement unit 26, a delay error of the current data link between the sending apparatus and the receiving apparatus. Finally, the output unit 25 of the receiving apparatus sends the delay error of the current data link between the sending apparatus and the receiving apparatus to the sending apparatus, so that the sending apparatus may determine, according to the delay error of the current data link between the sending apparatus and the receiving apparatus, the second time point at which the receiving apparatus outputs the CPRI data obtained by parsing the received packet.

Exemplarily, the foregoing delay error of the data link is equal to a sum of the average latency of the data link, the maximum latency jitter amount of the data link and the jitter tolerance margin of the data link.

Optionally, that the measurement unit 26 is used to: obtain the first time point, at which the sending apparatus sends the any one packet, included in the dedicated processing frame header of the any one packet; and determine a transmission latency of the any one packet according to the first time point at which the sending apparatus sends the any one packet and the third time point at which the receiving apparatus receives the any one packet, where the foregoing any one packet is one of the at least one packet.

Optionally, the foregoing service flow message further includes the service flow parsing parameter. That the parsing unit 22 parses the packet and encapsulates a parsed-out data payload in the packet into CPRI data specifically includes: parsing the packet based on the service flow parsing parameter in the parsed-out service flow message, and encapsulating the parsed-out data payload in the packet into CPRI data.

According to the receiving apparatus provided in this embodiment of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to the receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message.

In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

The unit division of the receiving apparatus in this embodiment of the present invention is an exemplary description, and in practice, there may be multiple unit division methods for constituting the receiving apparatus in this embodiment of the present invention.

Figure 5:
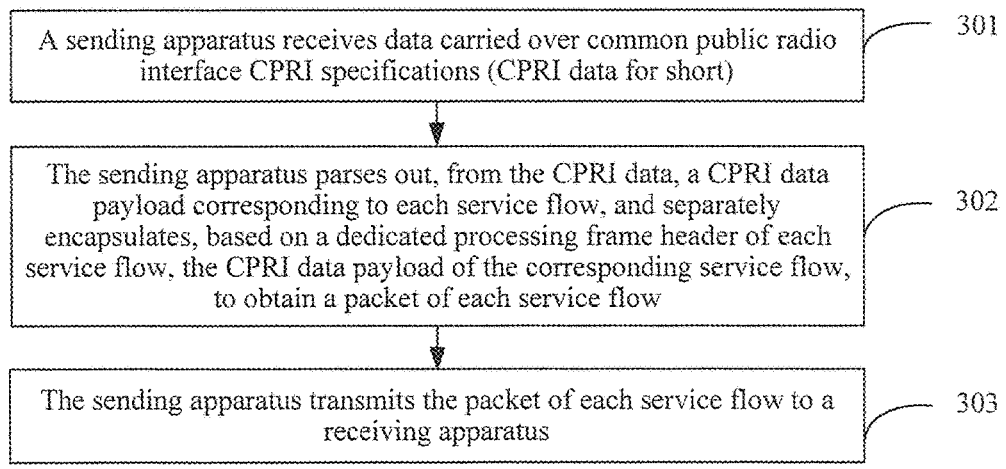
FIG. 5 is a schematic flowchart of a data transmission method according to an embodiment of the present invention.

An embodiment of the present invention provides a data transmission method, which may be implemented by a sending apparatus. Specifically, this embodiment is mainly specific to a process in which the sending apparatus converts CPRI data into a packet and transmits the packet to a receiving apparatus by using a switching apparatus. As shown in FIG. 5, the data transmission method specifically includes the following steps.

301. The sending apparatus receives data carried over common public radio interface CPRI specifications (CPRI data for short).

The foregoing CPRI data includes CPRI data of at least one service flow, and CPRI data of a different service flow is corresponding to different cell-level data. Exemplarily, the foregoing service flow may be a single cell, and may also be cells with a same route, which is not limited herein and may be set according to practical application.

It should be noted that, in this embodiment of the present invention, before the CPRI data carried in the packet is sent to the switching apparatus, 10 ms CPRI synchronization needs to be completed between the sending apparatus and the receiving apparatus, so that time points obtained subsequently and separately by the sending apparatus and the receiving apparatus are timed according to a same time reference.

302. The sending apparatus parses out, from the CPRI data, a CPRI data payload corresponding to each service flow, and separately encapsulates, based on a dedicated processing frame header of each service flow, the CPRI data payload of the corresponding service flow, to obtain a packet of each service flow.

Specifically, each service flow in the foregoing CPRI data is corresponding to one dedicated processing frame header. Exemplarily, a service flow of the at least one service flow is used as an example herein. If a packet corresponding to the service flow needs to be obtained, the sending apparatus first needs to obtain a dedicated processing frame header corresponding to the service flow, and encapsulate a CPRI data payload corresponding to the service flow by using the dedicated processing frame header, to obtain the packet corresponding to the service flow. The dedicated processing frame header includes at least a time stamp field and a service flow identifier field. Specifically, the time stamp field may be used to carry a time point at which the sending apparatus sends the packet corresponding to the service flow; the service flow identifier field includes a service flow identifier corresponding to the service flow. A receiving apparatus and a sending apparatus use a service flow identifier to identify a service flow to which each packet belongs.

Exemplarily, the sending apparatus strips, from the received CPRI data, the CPRI data payload carried in the CPRI data, and groups the stripped CPRI data payload, that is, the CPRI data corresponding to each service flow is classified into one group. CPRI data payloads corresponding to a same service flow are packetized, according to a multiplexed frame cycle, into the data payload of the packet corresponding to the service flow.

It should be noted that, the foregoing dedicated processing frame header of the packet not only carries the time point at which the sending apparatus sends the packet and the service flow identifier, but also carries information such as a priority, a packet fragment sequence number, and a CRC check.

303. The sending apparatus transmits the packet of each service flow to a receiving apparatus.

According to the data transmission method provided in this embodiment of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

Figure 6:
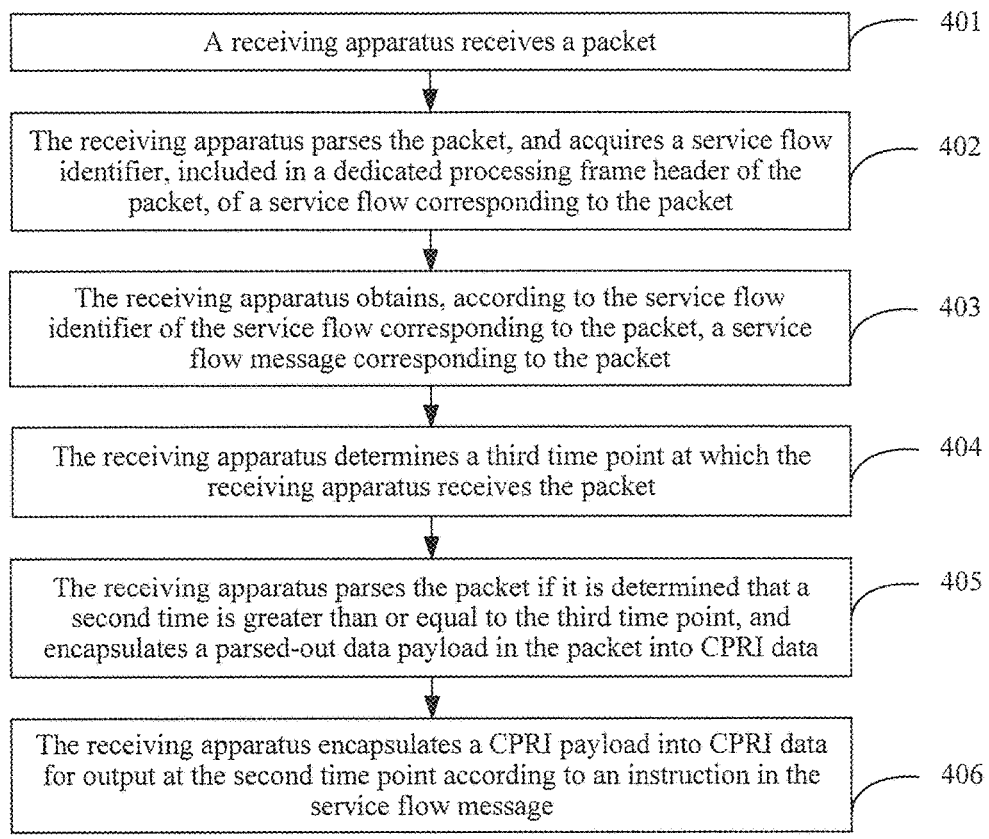
FIG. 6 is a schematic flowchart of another data transmission method according to an embodiment of the present invention.

An embodiment of the present invention provides a data transmission method, which may be implemented by a receiving apparatus. Specifically, this embodiment is mainly specific to a process in which after receiving a packet by using a switching apparatus, the receiving apparatus parses the packet and restores CPRI data of the packet. As shown in FIG. 6, the data transmission method specifically includes the following steps.

401. The receiving apparatus receives a packet.

Each packet received by the receiving apparatus is corresponding to a service flow, and the service flow in this embodiment of the present invention may be a single cell, and may also be cells with a same route, which is not limited herein and may be set according to practical application.

402. The receiving apparatus parses the packet, and obtains a service flow identifier, included in a dedicated processing frame header of the packet, of a service flow corresponding to the packet.

Exemplarily, the receiving apparatus performs decapsulation on the received packet, to obtain a dedicated processing frame header of the packet and a datagram of the packet; obtains the service flow identifier of the service flow corresponding to the packet from a service flow identifier field in the dedicated processing frame header; and obtains, from a time stamp field in the dedicated processing frame header, a first time point at which a sending apparatus sends the packet.

403. The receiving apparatus obtains a service flow message corresponding to the packet according to the service flow identifier of the service flow corresponding to the packet.

The foregoing service flow message includes a second time point at which the receiving apparatus needs to output CPRI data obtained by parsing the received packet and a corresponding service flow parsing parameter. The service flow parsing parameter includes a data format, on a CPRI, of the CPRI data carried in the packet corresponding to the service flow, parsing information that is used to parse the packet corresponding to the service flow, and the like. Exemplarily, the service flow message and the packet carrying the CPRI data are usually separately transmitted to the receiving apparatus; and after receiving the service flow message, the receiving apparatus obtains the service flow identifier that matches the service flow message, and obtains, from the service flow message, the second time point at which the receiving apparatus needs to output the CPRI data obtained by parsing the received packet.

404. The receiving apparatus determines a third time point at which the receiving apparatus receives the packet.

405. The receiving apparatus parses the packet if it is determined that a second time point is greater than or equal to the third time point, and encapsulates a parsed-out data payload in the packet into CPRI data.

Exemplarily, after receiving the packet, the receiving apparatus records a time point (that is, the third time point) at which the receiving apparatus receives the packet, and compares the third time point with the second time point that is used to instruct the receiving apparatus to send the packet. If the third time point is greater than the second time point, it indicates that the packet is expired; or if the third time point is less than or equal to the second time point, it indicates that the receiving apparatus needs to cache the packet until the second time point for output. Before the receiving apparatus outputs the packet, the receiving apparatus needs to restore, according to the service flow parsing parameter corresponding to the packet, the data payload carried in the packet to a CPRI data payload format, and in addition, encapsulate the CPRI data payload into the CPRI data for output.

406. The receiving apparatus outputs the CPRI data at the second time point according to an instruction of the service flow message.

According to the data transmission method provided in this embodiment of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

The following exemplarily describes the data transmission method provided in the embodiment of the present invention in a specific scenario. For descriptions in the following embodiments about a technical term, a concept, and the like that are related to the foregoing embodiments, reference may be made to the foregoing embodiments, The following embodiments are mainly specific to a process in which a transmit end transmits, to a receive end, a packet carrying CPRI data, and a process in which after receiving the packet carrying the CPRI data, the receive end restores the CPRI data carried in the packet, and transmits the CPRI data to a CPRI interface.

Figure 7:
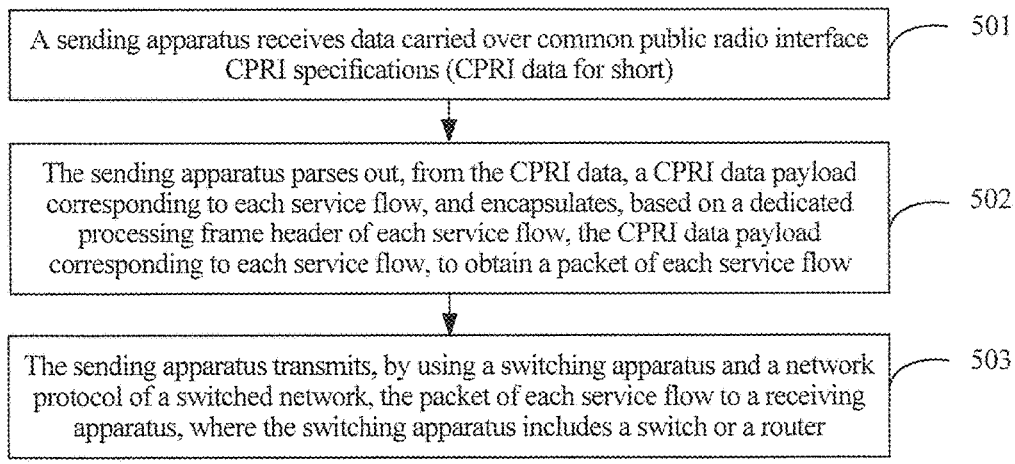
FIG. 7 is a schematic flowchart of still another data transmission method according to an embodiment of the present invention.

With reference to FIG. 7, the process in which the transmit end transmits, to the receive end, the packet carrying the CPRI data specifically includes the following steps:

501. A sending apparatus receives data carried over common public radio interface CPRI specifications (CPRI data for short).

The foregoing CPRI data includes CPRI data of at least one service flow, and CPRI data of a different service flow is corresponding to different cell-level data. It should be noted that, in this embodiment of the present invention, before the CPRI data carried in the packet is sent to the switching apparatus, 10 ms CPRI synchronization needs to be completed between the sending apparatus and the receiving apparatus, so that time points obtained subsequently and separately by the sending apparatus and the receiving apparatus are timed according to a same time reference.

502. The sending apparatus parses out, from the CPRI data, a CPRI data payload corresponding to each service flow, and encapsulates, based on a dedicated processing frame header of each service flow, the CPRI data payload of the corresponding service flow, to obtain a packet of each service flow.

Exemplarily, the sending apparatus strips, from the received CPRI data, the CPRI data payload carried in the CPRI data, and groups the stripped CPRI data payload, that is, the CPRI data corresponding to each service flow is classified into one group. CPRI data payloads corresponding to a same service flow are packetized, according to a multiplexed frame cycle, into the data payload of the packet corresponding to the service flow. For example, IQ data of one cell may form a set of packets according to a predetermined multiplexed frame cycle, or IQ data of multiple cells with a same route may form a set of packets according to a predetermined multiplexed frame cycle.

Exemplarily, in an embodiment, a service flow of the at least one service flow is used as an example. A dedicated processing frame header corresponding to the service flow is generated, a CPRI data payload corresponding to the service flow is encapsulated by using the dedicated processing frame header, and a packet corresponding to the service flow is obtained. The dedicated processing frame header needs to carry at least a time stamp field and a service flow identifier field. Specifically, the time stamp field may be used to carry a time point at which the sending apparatus sends the packet corresponding to the service flow; the service flow identifier field includes a service flow identifier corresponding to the service flow. A receiving apparatus and a sending apparatus use a service flow identifier to identify a service flow to which each packet belongs.

It should be noted that, the foregoing dedicated processing frame header of the packet not only carries the time point at which the sending apparatus sends the packet and the service flow identifier, but also carries information such as a priority, a packet fragment sequence number, and a CRC check.

Optionally, before step 502, the method may further include the following steps:

502a1. The sending apparatus determines a second time point at which a receiving apparatus outputs CPRI data obtained by parsing the received packet.

502a2. The sending apparatus sends, to the receiving apparatus, a service flow message corresponding to each service flow.

The foregoing service flow message includes the foregoing second time point, and a corresponding service flow parsing parameter. The service flow parsing parameter includes a data format, on a CPRI, of the CPRI data carried in the packet corresponding to the service flow, parsing information that is used to parse the packet corresponding to the service flow, and the like.

It should be noted that, in this embodiment of the present invention, a packet of one service flow may be corresponding to one service flow message, and packets in different periods of a same service flow may also be corresponding to one service flow message, which is not limited herein.

Further, optionally, before step 502a1, the method further includes:

502b. The sending apparatus receives a delay error, sent by the receiving apparatus, of a current data link between the sending apparatus and the receiving apparatus.

Based on the delay error, received by the sending apparatus in step 502b and sent by the receiving apparatus, of the current data link between the sending apparatus and the receiving apparatus, step 502a2 specifically includes the following process:

The sending apparatus determines, according to the delay error of the current data link between the sending apparatus and the receiving apparatus, a second time point at which the receiving apparatus outputs CPRI data obtained by parsing the received packet.

It should be noted that, the foregoing service flow message is generally transmitted to the receiving apparatus in a packet manner. However the foregoing service flow message and a packet carrying CPRI data are not transmitted synchronously. Therefore, when sending the service flow message, the sending apparatus may send one packet each time one service flow message is generated, or may encapsulate multiple service flow messages into one packet to transmit to the receiving apparatus.

503. The sending apparatus transmits, by using a switching apparatus and a network protocol of a switched network, the packet of each service flow to the receiving apparatus, where the switching apparatus includes a switch or a router.

Figure 8:
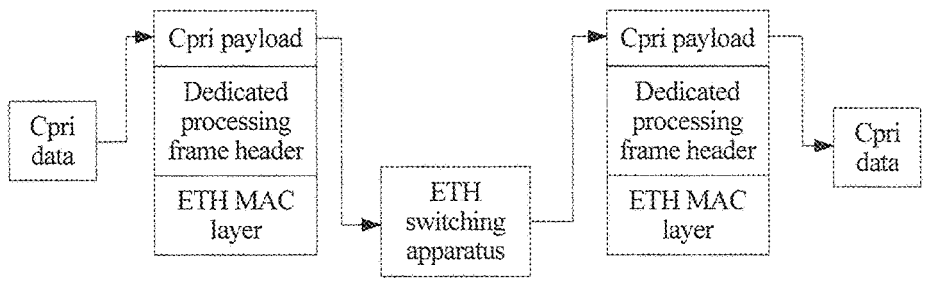
FIG. 8 is a schematic flowchart of one type of data transmission according to an embodiment of the present invention.
Figure 9:
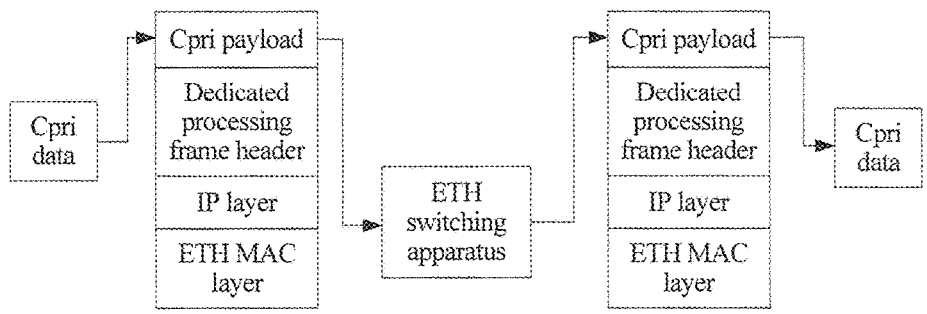
FIG. 9 is a schematic flowchart of another type of data transmission according to an embodiment of the present invention.
Figure 10:
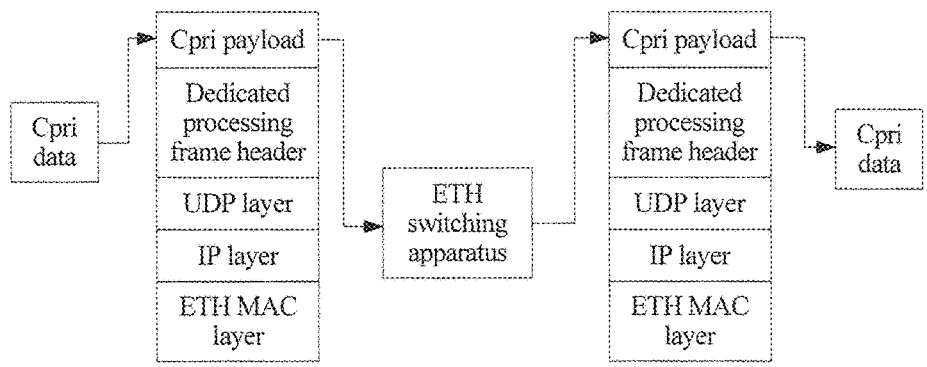
FIG. 10 is a schematic flowchart of still another type of data transmission according to an embodiment of the present invention.

Exemplarily, as shown in FIG. 8, the sending apparatus carries the packet at a Media Access Control (Media Access Control, MAC for short) layer of an ETH, and transmits the packet in the network by using an ETH switching device (for example, a switch); or as shown in FIG. 9, the sending apparatus carries the packet at an Internet Protocol (Internet Protocol, IP for short) layer of an ETH, and transmits the packet in the network by using an ETH switching device (for example, a router device); or as shown in FIG. 10, the sending apparatus carries the packet at a User Datagram Protocol (User Datagram Protocol, UDP for short) layer, and transmits the packet by using an ETH switching device (for example, a router device).

It should be noted that, in this embodiment of the present invention, CPRI data of a different service flow is encapsulated in a different packet, and the foregoing packet of the different service flow is distributed to a different receiving apparatus by using an ETH switching apparatus, so that transmission on different paths (for example, in point-to-point, point-to-multipoint, and multipoint-to-multipoint topological structures) can be performed in a same CPRI link.

503a. The sending apparatus separately records, into the dedicated processing frame header of the corresponding packet, a first time point at which the sending apparatus sends the packet of each service flow.

Exemplarily, the sending apparatus records, into a time stamp field of the dedicated processing frame header corresponding to each packet, the first time point at which the sending apparatus sends the packet, so that after receiving the packet, the receiving apparatus may perform comparison and subtraction according to the first time point carried in the packet and the time point at which the receiving apparatus receives the packet, to calculate a transmission latency of the packet.

According to the data transmission method provided in this embodiment of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

Figure 11:
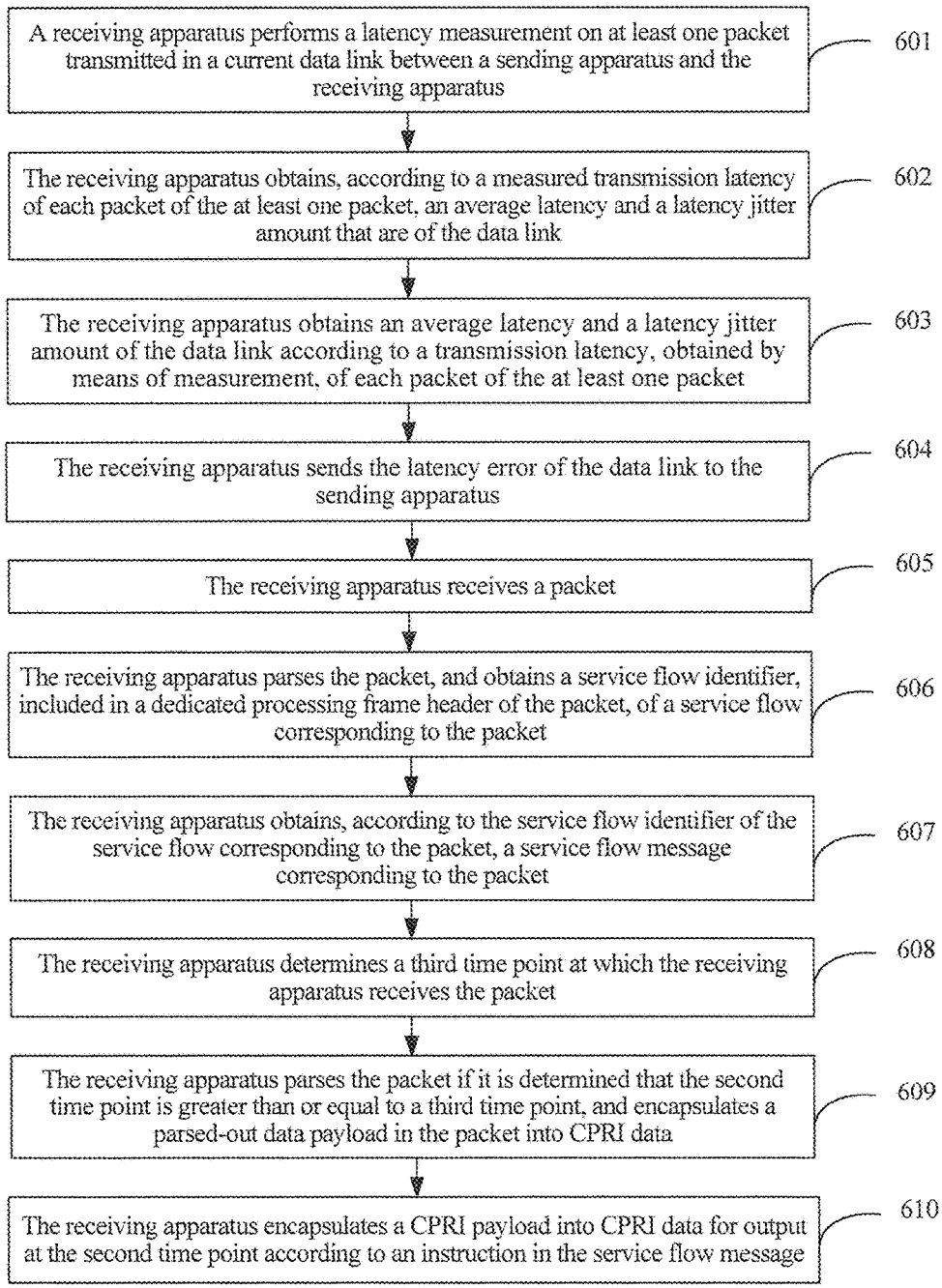
FIG. 11 is a schematic flowchart of yet another type of data transmission method according to an embodiment of the present invention.

With reference to FIG. 11, an embodiment is mainly specific to a process in which a receive end restores, after receiving a packet carrying CPRI data, the CPRI data carried in the packet and transmits the CPRI data to a CPRI interface. It should be noted that, the packet described in this embodiment is any one packet of at least one packet received by a receiving apparatus. Specifically, the process includes the following steps:

601. The receiving apparatus performs a latency measurement on at least one packet transmitted in a current data link between a sending apparatus and the receiving apparatus.

Optionally, in step 601, a method for obtaining the transmission latency of any one packet of the at least one packet specifically includes the following steps:

601a. The receiving apparatus obtains a first time point, at which the sending apparatus sends the any one packet, included in a dedicated processing frame header of the any one packet.

601*b*. The receiving apparatus determines a transmission latency of the any one packet according to the first time point at which the sending apparatus sends the any one packet and a third time point at which the receiving apparatus receives the any one packet.

The any one packet is one of the at least one packet. A method for obtaining a transmission latency of another packet is similar to the method for obtaining the transmission latency of the any one packet, which is not described herein.

602. The receiving apparatus obtains an average latency and a latency jitter amount of the data link according to a transmission latency, obtained by means of measurement, of each packet of the at least one packet.

Exemplarily, after obtaining the transmission latency of each packet of the at least one packet, the receiving apparatus calculates the average latency and the latency jitter amount of all the packets of the at least one packet.

603. The receiving apparatus determines a delay error of the data link according to the average latency of the data link, a maximum latency jitter amount of the data link, and a jitter tolerance margin of the data link.

Exemplarily, the delay error of the data link=the average latency of the data link+the maximum latency jitter amount of the data link+the jitter tolerance margin of the data link.

604. The receiving apparatus sends the delay error of the data link to the sending apparatus.

Exemplarily, after the receiving apparatus sends the delay error of the data link to the sending apparatus, the sending apparatus may determine, according to the delay error of the data link, a second time point at which the receiving apparatus outputs CPRI data obtained by parsing the received packet.

605. The receiving apparatus receives the packet.

Exemplarily, the receiving apparatus receives the at least one packet sent by a switching device. The packet described in step 604 is one of the foregoing at least one packet. A process in which another packet is parsed and sent is the same as the description herein. In addition, each packet is corresponding to one service flow. Specifically, the service flow may be a single cell, and may also be cells with a same route, which is not limited herein and may be set according to practical application.

It should be noted that, in this embodiment of the present invention, before the CPRI data carried in the packet is sent to the switching apparatus, 10 ms CPRI synchronization needs to be completed between the sending apparatus and the receiving apparatus, so that time points obtained subsequently and separately by the sending apparatus and the receiving apparatus are timed according to a same time reference.

606. The receiving apparatus parses the packet, and obtains a service flow identifier, included in the dedicated processing frame header of the packet, of a service flow corresponding to the packet.

Exemplarily, the receiving apparatus performs decapsulation on the received packet, to obtain a dedicated processing frame header of the packet and a datagram of the packet; obtains the service flow identifier of the service flow corresponding to the packet from a service flow identifier field in the dedicated processing frame header; and obtains, from a time stamp field in the dedicated processing frame header, a first time point at which a sending apparatus sends the packet. Before the receiving apparatus needs to transmit the packet to the CPRI interface subsequently, the receiving apparatus needs to parse the datagram and perform a restore operation on the data payload of the packet included in the datagram, and only after the CPRI data is restored, can transmit the restored CPRI data to the CPRI interface.

607. The receiving apparatus obtains a service flow message corresponding to the packet according to the service flow identifier of the service flow corresponding to the packet.

The foregoing service flow message includes a second time point at which the receiving apparatus needs to output CPRI data obtained by parsing the received packet and a corresponding service flow parsing parameter. The service flow parsing parameter includes a data format, on a CPRI, of the CPRI data carried in the packet corresponding to the service flow, parsing information that is used to parse the packet corresponding to the service flow, and the like. Exemplarily, the service flow message and the packet carrying the CPRI data are usually separately transmitted to the receiving apparatus; and after receiving the service flow message, the receiving apparatus obtains the service flow identifier that matches the service flow message, and obtains, from the service flow message, the second time point at which the receiving apparatus needs to output the CPRI data obtained by parsing the received packet.

It should be noted that, in this embodiment of the present invention, a packet of one service flow may be corresponding to one service flow message, and packets in different periods of a same service flow may also be corresponding to one service flow message, which is not limited herein.

608. The receiving apparatus determines a third time point at which the receiving apparatus receives the packet.

Exemplarily, after receiving the packet sent by the sending apparatus, the receiving apparatus records a current time point into the packet, that is, records a time stamp into the dedicated processing frame header of the packet, to facilitate subsequent use by the receiving apparatus.

609. The receiving apparatus parses the packet if it is determined that the second time point is greater than or equal to the third time point, and encapsulates a parsed-out data payload in the packet into CPRI data.

Exemplarily, after receiving the packet, the receiving apparatus records a time point (that is, the third time point) at which the receiving apparatus receives the packet, and compares the third time point with the second time point that is used to instruct the receiving apparatus to send the packet. If the third time point is greater than the second time point, it indicates that the packet is expired; or if the third time point is less than or equal to the second time point, it indicates that the receiving apparatus needs to cache the packet until the second time point for output. Before the receiving apparatus outputs the packet, the receiving apparatus needs to restores, according to the service flow parsing parameter corresponding to the packet, the data payload carried in the packet to a CPRI data payload format for output.

Optionally, when the service flow message further includes the service flow parsing parameter, step 609 specifically includes:

609*a*. The receiving apparatus parses the packet based on the service flow parsing parameter of the service flow message, and encapsulates the parsed-out data payload in the packet into the CPRI data.

The service flow parsing parameter includes but is not limited to a CPRI data format, on a CPRI, of the CPRI data carried in the packet corresponding to the service flow, parsing information that is used to parse the packet corresponding to the service flow, and the like.

610. The receiving apparatus outputs the CPRI data at the second time point according to an instruction of the service flow message.

Exemplarily, the packet of this embodiment of the present invention may be one of packets of a service flow. For meeting a requirement of CPRI data synchronization, packets in different periods of a same service flow need to be transmitted to a CPRI interface at a same time point. Certainly, if multiple packets of the service flow are transmitted to different CPTI interfaces, packets that are corresponding to a same service flow and that are transmitted to a same CPRI interface are transmitted at a same time point.

According to the data transmission method provided in this embodiment of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

An embodiment of the present invention provides a sending device, which can be configured to implement the sending apparatuses in the embodiments shown in FIG. 5, FIG. 6, FIG. 7, and FIG. 11. For content such as a working mechanism, interaction with another network element, a related technical term, and a concept of the sending device, reference may be made to the embodiments shown in FIG. 5 to FIG. 11, and details are not described herein.

Figure 12:
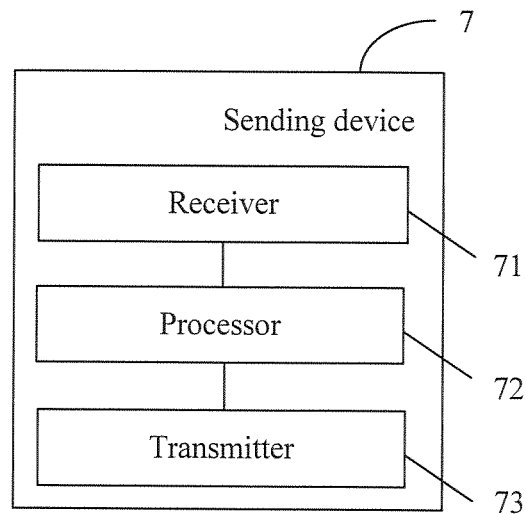
FIG. 12 is a schematic apparatus diagram of a sending device according to another embodiment of the present invention.

An embodiment of the present invention provides a sending device. As shown in FIG. 12, a sending device 7 includes: a receiver 71, a processor 72, and a transmitter 73.

The receiver is configured to receive data carried over common public radio interface CPRI specifications (CPRI data for short), where the CPRI data includes CPRI data of at least one service flow.

The processor is configured to parse out, from the CPRI data, a CPRI data payload corresponding to each service flow, and separately encapsulate, based on a dedicated processing frame header of each service flow, the CPRI data payload of the corresponding service flow, to obtain a packet of each service flow, where the dedicated processing frame header includes a service flow identifier corresponding to the service flow.

The transmitter is configured to transmit the packet of each service flow to a receiving apparatus.

Optionally, the processor 72 is further configured to separately record, into the dedicated processing frame header of the corresponding packet, a first time point at which the sending apparatus sends the packet of each service flow.

Optionally, the processor 72 is further configured to determine a second time point at which the receiving apparatus outputs CPRI data obtained by parsing the received packet; and configured to send, to the receiving apparatus, a service flow message corresponding to each service flow, where the service flow message includes the second time point that is used to instruct the receiving apparatus to send the packet of each service flow and a corresponding service flow parsing parameter.

Optionally, the processor 72 is further configured to receive a delay error, sent by the receiving apparatus, of a current data link between the sending apparatus and the receiving apparatus.

That the processor 72 determines a second time point at which the receiving apparatus outputs CPRI data obtained by parsing the received packet is specifically used to determine, according to the delay error of the current data link between the sending apparatus and the receiving apparatus, the second time point at which the receiving apparatus outputs the CPRI data obtained by parsing the received packet.

Optionally, the transmitter 73 is specifically configured to transmit, by using a switching apparatus and a network protocol of a switched network, the packet of each service flow to the receiving apparatus, where the switching apparatus includes a switch or a router.

According to the sending device provided in this embodiment of the present invention, the sending device strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving device at a first time point corresponding to the packet by using a switching device; and after receiving the packet, the receiving device parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

An embodiment of the present invention provides a receiving device, which can be configured to implement the receiving apparatuses in the embodiments shown in FIG. 5, FIG. 6, FIG. 7, and FIG. 11. For content such as a working mechanism, interaction with another network element, a related technical term, and a concept of the receiving device, reference may be made to the embodiments shown in FIG. 5 to FIG. 11, and details are not described herein.

Figure 13:
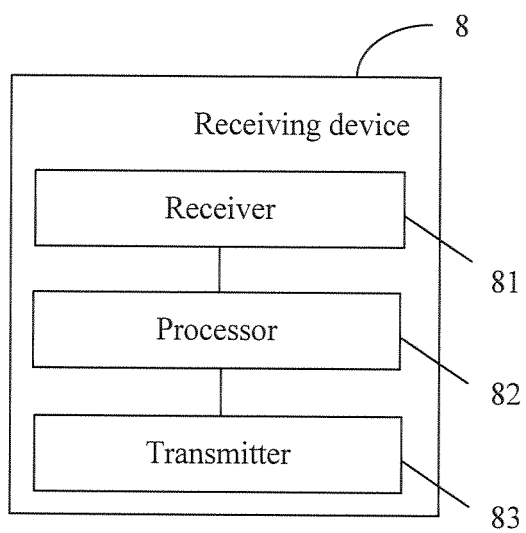
FIG. 13 is a schematic apparatus diagram of a receiving device according to another embodiment of the present invention.

As shown in FIG. 13, a receiving device 8 includes: a receiver 81, a processor 82, and a transmitter 83.

The receiver 81 is configured to receive a packet.

The processor 82 is configured to parse the packet and obtain a service flow identifier, included in a dedicated processing frame header of the packet, of a service flow corresponding to the packet; configured to obtain a service flow message corresponding to the packet according to the service flow identifier of the service flow corresponding to the packet, where the service flow message includes a second time point that is used to instruct the receiving apparatus to send the packet; configured to determine a third time point at which the receiving apparatus receives the packet; and configured to parse the packet if it is determined that the second time point is greater than or equal to the third time point, and encapsulate a parsed-out data payload in the packet into CPRI data.

The transmitter 83 is configured to output the CPRI data at the second time point according to an instruction of the service flow message.

Optionally, the processor 82 is further configured to perform a latency measurement on at least one packet transmitted in a current data link between a sending apparatus and the receiving apparatus; configured to obtain an average latency and a latency jitter amount of the data link according to a transmission latency, obtained by means of measurement, of each packet of the at least one packet; and configured to determine a delay error of the data link according to the average latency of the data link, a maximum latency jitter amount of the data link, and a jitter tolerance margin of the data link.

The transmitter 83 is further configured to send the delay error of the data link to the sending apparatus.

Optionally, that the processor 82 performs a latency measurement on at least one packet transmitted in a current data link between a sending apparatus and the receiving apparatus is specifically used to: obtain a first time point, at which the sending apparatus sends any one packet, included in a dedicated processing frame header of the any one packet; and determine a transmission latency of the any one packet according to the first time point at which the sending apparatus sends the any one packet and the third time point at which the receiving apparatus receives the any one packet.

The any one packet is one of the at least one packet.

Optionally, when the foregoing service flow message further includes a service flow parsing parameter, that the processor 82 parses the packet and encapsulates a parsed-out data payload in the packet into CPRI data is specifically used to: parse the packet based on the service flow parsing parameter in the service flow message, and encapsulate the parsed-out data payload in the packet into the CPRI data.

According to the receiving device provided in this embodiment of the present invention, a sending device strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to the receiving device at a first time point corresponding to the packet by using a switching device; and after receiving the packet, the receiving device parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. In the prior art, point-to-point transmission is specific to only a CPRI data frame corresponding to a single service flow, which limits networking flexibility. Compared with the prior art, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

Figure 14:
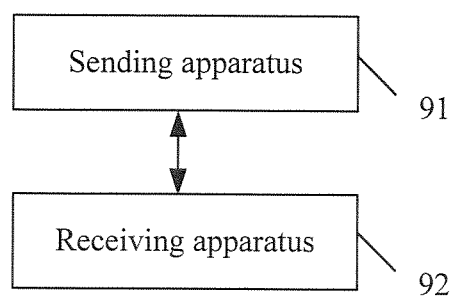
FIG. 14 is a schematic system diagram of a network system according to an embodiment of the present invention.

The sending apparatus and the receiving apparatus that are provided in the embodiments of the present invention may further form a network system, to implement the data transmission method provided in the embodiments shown in FIG. 5 to FIG. 11. Exemplarily, as shown in FIG. 14, a network system 9 includes a sending apparatus 91 and a receiving apparatus 92. The sending apparatus 91 may be the sending apparatus shown in FIG. 1 and FIG. 2; and the receiving apparatus 92 may be the receiving apparatus shown in FIG. 3 and FIG. 4.

According to the network system provided in this embodiment of the present invention, a sending apparatus strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving apparatus at a first time point corresponding to the packet by using a switching apparatus; and after receiving the packet, the receiving apparatus parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. An existing CPRI data transmission solution by using an Ethernet transmission network is specific to only point-to-point transmission of a CPRI data frame corresponding to a single service flow, which limits networking flexibility. However, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

Figure 15:
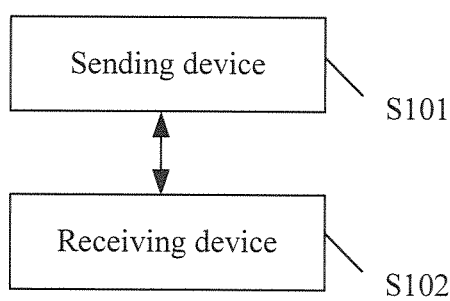
FIG. 15 is a schematic system diagram of another network system according to an embodiment of the present invention.

The sending device and the receiving device that are provided in the embodiments of the present invention may further form a network system, to implement the data transmission method provided in the embodiments shown in FIG. 5 to FIG. 11. Exemplarily, as shown in FIG. 15, a network system S10 includes a sending device S101 and a receiving device S102. The sending device S101 may be the sending device shown in FIG. 12, and the receiving device S102 may be the receiving device shown in FIG. 13.

According to the network system provided in this embodiment of the present invention, a sending device strips a CPRI data payload that is carried in CPRI data and that is corresponding to a different service flow, encapsulates the CPRI data payload corresponding to a dedicated processing frame header of each service flow by using the dedicated processing frame header, to obtain a packet corresponding to each service flow, and forwards each obtained packet to a receiving device at a first time point corresponding to the packet by using a switching device; and after receiving the packet, the receiving device parses out the CPRI data payload carried in the packet, restores the CPRI data from the CPRI data payload, and obtains a service flow message corresponding to the packet according to a service flow identifier in the dedicated processing frame header of the packet, so as to output the restored CPRI data at a second time point included in the service flow message. An existing CPRI data transmission solution by using an Ethernet transmission network is specific to only point-to-point transmission of a CPRI data frame corresponding to a single service flow, which limits networking flexibility. However, the present invention can support CPRI data corresponding to multiple service flows to be exchanged between multiple RRUs and multiple BBUs in any network by using an existing switching device from point to point, point to multipoint, and multipoint to multipoint. This not only reduces CPRI networking costs, but also improves CPRI networking flexibility.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A data transmission method, comprising:
    receiving, by a sending apparatus, data carried over common public radio interface (CPRI) specifications (CPRI data), wherein the CPRI data comprises CPRI data of at least one service flow;
    parsing out, from the CPRI data, a CPRI data payload corresponding to each of the at least one service flow, and separately encapsulating, based on a dedicated processing frame header of each of the at least one service flow, the CPRI data payload corresponding to each of the at least one service flow, to obtain a packet of each of the at least one service flow, wherein the dedicated processing frame header comprises a service flow identifier corresponding to each of the at least one service flow;
    transmitting the packet of each of the at least one service flow to a receiving apparatus;
    determining, by the sending apparatus, a second time point at which the receiving apparatus outputs CPRI data, the CPRI data obtained by the sending apparatus in response to the receiving apparatus parsing the received packet; and
    sending, to the receiving apparatus, a service flow message corresponding to each of the at least one service flow, wherein the service flow message comprises the second time point and a corresponding service flow parsing parameter.

2. The method according to claim 1, further comprising:
    separately recording, into the dedicated processing frame header of the corresponding packet, a first time point at which the sending apparatus sends the packet of each of the at least one service flow.

3. The method according to claim 1, further comprising:
    receiving a delay error, sent by the receiving apparatus, of a current data link between the sending apparatus and the receiving apparatus; and
    wherein determining a second time point at which the receiving apparatus outputs CPRI data obtained in response to the receiving apparatus parsing the received packet comprises:
        determining, according to the delay error of the current data link between the sending apparatus and the receiving apparatus, the second time point at which the receiving apparatus outputs the CPRI data obtained in response to the receiving apparatus parsing the received packet.

4. The method according to claim 1, wherein transmitting the packet of each of the at least one service flow to a receiving apparatus comprises:
transmitting, by using a switching apparatus and a network protocol of a switched network, the packet of each of the at least one service flow to the receiving apparatus, wherein the switching apparatus comprises a switch or a router.

5. A sending device, comprising:
a receiver, configured to receive common public radio interface (CPRI) data comprising CPRI data of at least one service flow;
a processor, configured to parse out, from the CPRI data, a CPRI data payload corresponding to each of the at least one service flow, and separately encapsulate, based on a dedicated processing frame header of each of the at least one service flow, the CPRI data payload of the corresponding service flow, to obtain a packet of each of the at least one service flow, wherein the dedicated processing frame header comprises a service flow identifier corresponding to each of the at least one service flow;
a transmitter, configured to transmit, by using a switching apparatus, the packet of each of the at least one service flow to a receiving apparatus; and
wherein the processor is further configured to:
determine a second time point at which the receiving apparatus outputs CPRI data, the CPRI data obtained in response to the receiving apparatus parsing the received packet; and
send, to the receiving apparatus, a service flow message corresponding to each of the at least one service flow, wherein the service flow message comprises a corresponding service flow parsing parameter and the second time point for instructing the receiving apparatus to send the packet of each of the at least one service flow.

6. The sending device according to claim 5, wherein the processor is further configured to separately record, into the dedicated processing frame header of the corresponding packet, a first time point at which the sending apparatus sends the packet of each of the at least one service flow.

7. The sending device according to claim 5, wherein the processor is further configured to:
receive a delay error, sent by the receiving apparatus, of a current data link between the sending apparatus and the receiving apparatus; and
determine, according to the delay error of the current data link between the sending apparatus and the receiving apparatus, the second time point at which the receiving apparatus outputs the CPRI data obtained in response to the receiving apparatus parsing the received packet.

8. The sending device according to claim 5, wherein the transmitter is configured to transmit, by using the switching apparatus and a network protocol of a switched network, the packet of each of the at least one service flow to the receiving apparatus, wherein the switching apparatus comprises a switch or a router.

* * * * *